(12) United States Patent
Sun et al.

(10) Patent No.: US 12,717,448 B2
(45) Date of Patent: Aug. 25, 2026

(54) DEVICES AND METHODS FOR REMOTE CONTROL AND ANNOTATION ASSOCIATED WITH AN ELECTRONIC DEVICE

(71) Applicant: HUAWEI TECHNOLOGIES CO., LTD., Shenzhen (CN)

(72) Inventors: Junwei Sun, Kanata (CA); Jun Li, Kanata (CA); Zhe Liu, Kanata (CA); Qiang Xu, Kanata (CA); Wenhao Wu, Kanata (CA); Jiaxi Wang, Kanata (CA); Zhongjia Bai, Kanata (CA); Yanhai Zhang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/678,685

(22) Filed: May 30, 2024

(65) Prior Publication Data

US 2024/0310963 A1 Sep. 19, 2024

Related U.S. Application Data

(63) Continuation of application No. PCT/CN2021/134840, filed on Dec. 1, 2021.

(51) Int. Cl.
*G06F 3/044* (2006.01)
*G06F 3/0346* (2013.01)
*G06F 3/0354* (2013.01)

(52) U.S. Cl.
CPC .......... *G06F 3/0442* (2019.05); *G06F 3/0346* (2013.01); *G06F 3/03545* (2013.01)

(58) Field of Classification Search
CPC .. G06F 3/0442; G06F 3/0346; G06F 3/03545; G06F 3/0383; G06F 2203/0384; G01C 21/1654; G01C 25/005
See application file for complete search history.

(56) References Cited

U.S. PATENT DOCUMENTS 7,696,980 B1 4/2010 Piot et al.
10,564,736 B2 * 2/2020 Lee ....................... G06F 1/3259
10,908,708 B1 * 2/2021 Menendez ............ G06F 3/0346
11,209,916 B1 * 12/2021 Zimmermann ....... G06F 3/0325
2013/0106796 A1 * 5/2013 Yilmaz ............... G06F 3/03545
345/179

(Continued)

FOREIGN PATENT DOCUMENTS

CN 101872260 A 10/2010
CN 103677321 A 3/2014
CN 110134261 A 8/2019

OTHER PUBLICATIONS

Jackson, B., OVR Stylus: Designing Pen-Based 3D Input Devices for Virtual Reality. 2020 IEEE Conference on Virtual Reality and 3D User Interfaces Abstracts and Workshops (VRW) (pp. 13-18), Mar. 2020, IEEE.

(Continued)

*Primary Examiner* — Antonio Xavier

(57) ABSTRACT

There is a provided a pointing device, for example a remote pen which includes a multimode switch or button for transitioning the pointing device between three or more modes of operation. The mode of operation can include a first mode, an annotation mode and an air mouse mode. The remote point device further includes an inertial measurement unit configured for determination orientation information associated with the pointing device, which provides a means for determination of changes in x and y with respect to a cursor associated with a screen of a display device being controlled by the pointing device. The pointing device is further configured to provide different control/display (C/D) gains depending on the action being performed by the pointing device.

18 Claims, 5 Drawing Sheets

(56) References Cited

U.S. PATENT DOCUMENTS

| | | | | |
|---|---|---|---|---|
| 2014/0176472 | A1* | 6/2014 | Lin | G06F 3/041<br>345/173 |
| 2014/0232649 | A1 | 8/2014 | Youssef et al. | |
| 2015/0219767 | A1* | 8/2015 | Humphreys | G01S 19/485<br>342/357.26 |
| 2016/0110057 | A1 | 4/2016 | Choi et al. | |
| 2016/0139690 | A1 | 5/2016 | Chang | |
| 2017/0243330 | A1* | 8/2017 | Stec | G06T 7/20 |
| 2018/0024658 | A1* | 1/2018 | Yamamoto | G06F 3/038<br>345/179 |
| 2021/0034188 | A1* | 2/2021 | Kwon | G06F 3/03545 |

OTHER PUBLICATIONS

Elsayed, H., Barrera Machuca, M.D., Schaarschmidt, C., Marky, K., Müller, F., Riemann, J., Matviienko, A., Schmitz, M., Weigel, M. and Mühlhäuser, M., VRSketchPen: Unconstrained Haptic Assistance for Sketching in Virtual 3D Environments. 26th ACM Symposium on Virtual Reality Software and Technology (pp. 1-11), Nov. 2020.

Pham, D.M. and Stuerzlinger, W. Is the pen mightier than the controller? A comparison of input devices for selection in virtual and augmented reality. 25th ACM Symposium on Virtual Reality Software and Technology (pp. 1-11), Nov. 2019.

Chen, J., Yu, F., Yu, J. and Lin, L., A Three-Dimensional Ultrasonic Pen-Type Input Device With Millimeter-Level Accuracy for Human-Computer Interaction. IEEE Access, 8, pp. 143837-143847, 2020.

Casiez, G., Roussel, N. and Vogel, D., 2012, May. 1€ filter: a simple speed-based low-pass filter for noisy input in interactive systems. In Proceedings of the SIGCHI Conference on Human Factors in Computing Systems (pp. 2527-2530), CHI 2012, May 5-10, 2012, Austin, Texas, USA.

Mahony et al., Nonlinear Complementary Filters on the Special Orthogonal Group, IEEE Transactions on Automatic Control, vol. 53, No. 5, Jun. 2008.

* cited by examiner

DEVICES AND METHODS FOR REMOTE CONTROL AND ANNOTATION ASSOCIATED WITH AN ELECTRONIC DEVICE

CROSS-REFERENCE TO RELATED APPLICATIONS

This application is a continuation of International Application No. PCT/CN2021/134840, entitled "DEVICES AND METHODS FOR REMOTE CONTROL AND ANNOTATION ASSOCIATED WITH AN ELECTRONIC DEVICE", filed on Dec. 1, 2021, which is hereby incorporated by reference in its entirety.

TECHNICAL FIELD

The present disclosure pertains to electronic devices, and in particular to devices and methods for remote control and annotation associated with an electronic device.

BACKGROUND

The use of pointing devices to control a computer and other electronic devices, hereafter referred to as computing devices, is well known in the art. Examples of such pointing devices can include computer mice, track balls, track pads, remote controls, keypads, terminal programs, touch screens and pens. Examples of computing devices include laptop and desktop computers, tablets, smart phones, televisions, and various networked smart audio/visual (A/V) devices.

There are many commercial devices that are used to interact with large displays remotely. The Logitech Spotlight works as a laser pointer on a remote display, users can move a cursor with the device. Devices like the Apple TV remote have a touchpad, which can be used to control a cursor on the screen. Devices like Gyration Air Mouse uses inertial measurement unit (IMU) data, typically from the associated gyroscope, to estimate orientation for control of a cursor. In addition, most commercial remote pens are used for operation similar to the above air mouse. However, each of these devices do not enable an annotation function.

Furthermore, devices like Samsung Flip Pen or Microsoft Surface Hub Pen do not have remote mode as these devices are used for near-field interaction.

Besides commercial devices, various research papers have proposed different pen designs. Some designs propose putting markers on the pen to enable vision-based tracking. In order to enable use of these types of pens, optical tracking systems are needed in order to track the pen's position. Other pen designs include an ultrasound transmitter on the pen and receivers on the display in order to enable more precise tracking of the pen. However, each of these types of systems require additional hardware equipment in order to enable functionality thereof.

Therefore, there is a need for devices, systems and methods for remote control and annotation associated with an electronic device that obviates or mitigates one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

Embodiments of the present disclosure provide devices and methods for remote control and annotation associated with an electronic device.

In accordance with embodiments, there is provided a pointing device including a multimode switching module, switching a mode of the pointing device between a first mode, an air mouse mode, and an annotation mode. The pointing device further including a control module, detecting the mode of the pointing device. The pointing device further includes an inertial measurement unit (IMU), obtaining information indicative of orientation of the pointing device upon the control module detecting that the mode of the pointing device switches from the first mode to the air mouse mode or the annotation mode. The pointing device additionally includes a communication module, obtaining the information from the IMU and transmitting the information to a display device The examples disclosed herein provide a pointing device which allows for the control of movement of a cursor associated with a display device and is configured for transition between multiple modes including a first mode, an air mouse mode and an annotation mode. By the use of a multimode switch, switching modes is simple and does not necessitate the movement between different switches associated with the pointing device.

In some embodiments, the first mode is an idle mode wherein movement of the pointing device does not change the location of a cursor associated with a display device and being controlled by the pointing device. In some embodiments, the first mode is a near field writing mode, wherein the communication module is further configured to transmit information indicative of the near field writing mode. For example, near field writing mode can be associated with using a pointing device for writing on a touchscreen.

According to embodiments, when the pointing device is in the air mouse mode, a cursor moves on the display device according to the information indicative of orientation of the pointing device.

According to embodiments, wherein when the pointing device is in the annotation mode, a trajectory shows on the display device according to the information indicative of orientation of the pointing device.

In some embodiments, the multimode switch is a capacitive touch button having at least three states, each state corresponding to one of the modes of the pointing device.

In some embodiments, the at least three states of the capacitive touch button include a non-touch state corresponding to the first mode of the pointing device, a touched state corresponding to the air mouse mode, and a pressed state corresponding to the annotation mode.

In some embodiments, the multimode switching module includes a combination of at least two buttons, wherein a combination of states of each of the at least two buttons corresponds to one of the modes of the pointing device, wherein a different combination defines each mode of the pointing device.

In some embodiments, the IMU is a 6-axis IMU including a gyroscope and an accelerometer, wherein the gyroscope and accelerometer are configured to provide data indicative of a change in the vertical orientation (pitch) and a change in the horizontal orientation (yaw). In some embodiments, the IMU is a 9-axis IMU including a gyroscope, an accelerometer and a magnetometer, wherein gyroscope and accelerometer are configured to provide data at least indicative of a change in the horizontal and vertical orientation of the pointing device and wherein the magnetometer is configured to provide further data for refined determination of the change in the horizontal orientation of the pointing device.

In some embodiments, a first control display gain is associated with the air mouse mode and a second control display gain is associated with the annotation mode; the first display gain is different from the second display gain.

In some embodiments, the pointing device includes a first low-pass filter, which is configured to modify output from the gyroscope. In some embodiments, the pointing device further includes a second low-pass filter, which is configured to modify output from the accelerometer.

In some embodiments, the pointing device includes a first low-pass filter, a second low-pass filter, and a third low-pass filter, wherein the first low-pass filter is configured to modify output from the gyroscope, the second low-pass filter is configured to modify output from the accelerometer, and the third low-pass filter is configured to modify output from the magnetometer.

A technical benefit of a pointing device according to embodiments of the present disclosure may be that using capacitive touch button can allow for easy three-mode switching with only one finger without changing grip. A further technical benefit may be the prevention of IMU drifting from affecting the performance of annotation.

Another technical benefit of a pointing device according to embodiments of the present disclosure may be a sensor fusion process that may provide faster convergence when reducing noise in raw data.

In accordance with embodiments, there is provided a method remotely interacting with a display device by a pointing device. The method includes switching, by a multimode switching module, the pointing device between a first mode, an air mouse mode, and an annotation mode. The method further includes detecting, by a control module, a mode of the pointing device. The method further includes obtaining, from an inertial measurement unit (IMU), information indicative of an orientation of the pointing device upon the control module detecting that the pointing device switching from the first mode to the annotation mode or the air mouse mode. The method further includes obtaining, by a communication module, the information and transmitting the information to the display device.

In some embodiments, the method further includes applying a first control display gain when operating the pointing device in the air mouse mode and determining a cursor position using the information indicative of the orientation of the pointing device for evaluation of a horizontal orientation and a vertical orientation of the pointing device and a horizontal angular velocity and a vertical angular velocity of the pointing device.

In some embodiments, the method further includes applying a second control display gain when operating the pointing device in the annotation mode and determining a trajectory of the cursor using the information indicative of the orientation of the pointing device for evaluation of a horizontal orientation and a vertical orientation of the pointing device and a horizontal angular velocity and a vertical angular velocity of the pointing device.

In some embodiments, applying the first control display gain further includes determining a velocity associated with the pointing device and selecting the first control display gain based on the velocity. In some embodiments, applying the second control display gain further includes determining a velocity associated with the pointing device and selecting the second control display gain based on the velocity.

In some embodiments, upon detection of the pointing device being in the annotation mode, the method further includes predicting a shape being annotated.

In some embodiments, the method further includes filtering using a first low-pass filter output from a gyroscope associated with the IMU. In some embodiments, the method further includes filtering using a second low-pass filter output from an accelerometer associated with the IMU. In some embodiments, the method further includes filtering using a first low-pass filter, a second low-pass filter, and a third low-pass filter, wherein the first low-pass filter modifying output from a gyroscope associated with the IMU, the second low-pass filter modifying output from an accelerometer associated with the IMU, and the third low-pass filter modifying output from a magnetometer associated with the IMU.

In some embodiments, the first mode is a near field writing mode, wherein the method further includes transmitting by the communication module information indicative of the near field writing mode.

In some embodiments, wherein in the air mouse mode, a cursor associated with the display device moves at least in part based on the information indicative of orientation of the pointing device.

In some embodiments, in the annotation mode, a trajectory of a cursor associated with the display device is shown, the trajectory based at least in part on the information indicative of orientation of the pointing device.

In some embodiments, there is provided a computer program comprising instructions which, when the program is executed by a computer, cause the computer to carry out the above described methods.

In some embodiments, there is provided a computer-readable medium comprising instructions which, when the program is executed by a computer, cause the computer to carry out the above-described methods.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
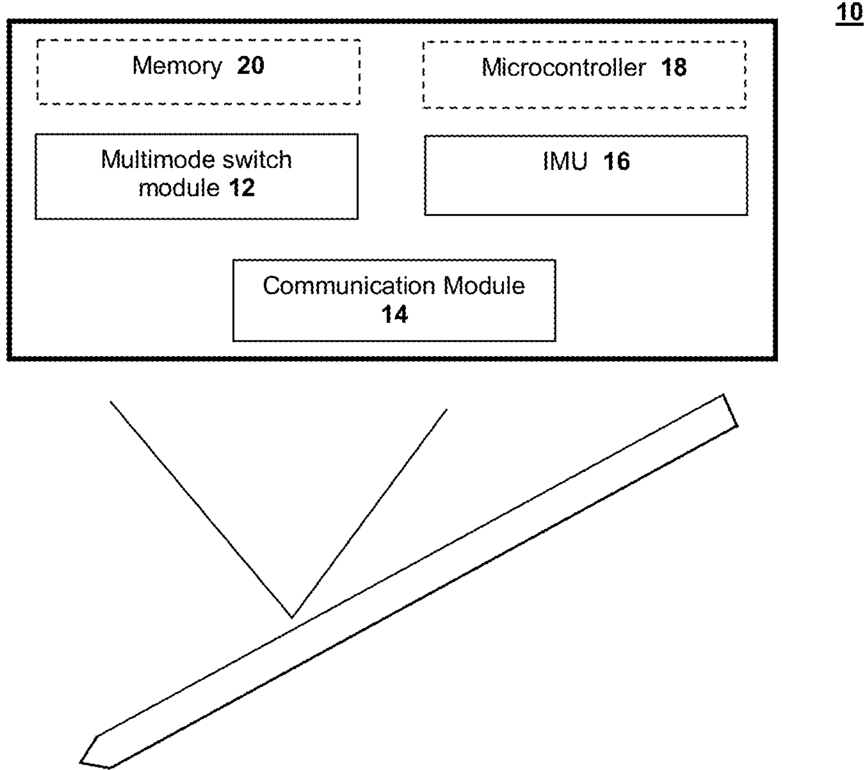
FIG. 1 illustrates a pointing device featuring a multimode switch, according to an embodiment of the present disclosure.

It has been realized that pointing devices, for example remote controlling pens do not have annotation mode. Even if these pointing devices support different modes, they use regular two-state buttons which requires a button for the selection of each operational mode of the pointing device. It has also been realized that an inertial measurement unit (IMU) that uses gyroscope data for determination of Euler angles, e.g. related to pitch, yaw and roll, leads to drifting of this determination after long use.

According to embodiments, there is a provided a pointing device, for example a remote controlling pen which includes a multimode switch module, for example a multimode button or switch or capacitive touch button, for transitioning the pointing device between three or more modes of operation. The mode of operation can include a first mode, an annotation mode, and an air mouse mode. According to embodiments, the pointing device further includes an inertial measurement unit configured for determination of orientation information, for example pitch and yaw, associated with the pointing device, which provides a means for determination of changes in x and y with respect to a cursor associated with a screen of a display device being controlled by the pointing device. According to some embodiments, the pointing device is further configured to provide different control/display (C/D) gains depending on the action being performed by the pointing device. For example, a first C/D gain is applied for movement of a cursor when the pointing device is in an air mouse mode and a second C/D gain is applied for the movement of a cursor when the pointing device is in an annotation mode.

Embodiments of the present disclosure relate a pointing device including a multimode switch module configured to switch the pointing device between a first mode, an air mouse mode and an annotation mode. The pointing device further includes an inertial measurement unit (IMU) configured to determine information indicative of the orientation, for example a pitch and a yaw, associated with the pointing device. The pointing device further includes a communication module communicatively coupled to a control module which may connect to the multimode switch module and the IMU to detect the mode of the pointing device. The IMU obtains the information indicative of the orientation of the pointing device upon the control module detecting that the pointing device switches from the first mode to the air mouse mode or the annotation mode. The communication module configured to transmit the information indicative of the orientation information associated with the pointing device to a display device.

According to some embodiments, the information indicative of the orientation information that is transmitted to a display device (a PC or a screen) is the IMU raw data. In these embodiments, sensor fusion and cursor position calculation, which may include for example application of a control display gain, are performed by a processor or microprocessor associated with the display device.

According to some embodiments, the information indicative of the orientation information transmitted to the display device are the results of sensor fusion which is performed on the pointing device. In these embodiments, cursor position calculation which may include application of a control display gain, are performed by a processor or microprocessor associated with the display device.

According to some embodiments, the information indicative of the orientation information transmitted to the display device is indicative of cursor position and optionally movement. In these embodiments, sensor fusion and cursor calculation are performed on the pointing device.

In some embodiments, the first mode is an idle mode, wherein movement of the pointing device does not cause movement of the cursor associated with the display device connected to the pointing device. In some embodiments, the first mode is a near field writing mode, wherein the pointing device is communication with the display device for control of the cursor associated therewith using near field communication. For example, near field writing mode can be associated with using a pointing device for writing on a touchscreen.

According to embodiments, air mouse mode defines a mode wherein movement of the pointing device changes the location of a cursor associated with a display device and being controlled by the pointing device.

According to embodiments, annotation mode defines a mode wherein movement of the pointing device changes the location of a cursor associated with a display device and being controlled by the pointing device. Further in annotation mode a trace of the trajectory of the cursor is displayed on the display screen.

In some embodiments, the IMU is a 6-axis IMU including a gyroscope and an accelerometer. In some embodiments, the IMU is a 9-axis IMU including a gyroscope, an accelerometer and a magnetometer.

In some embodiments, a first control display gain is associated with the air mouse mode and a second control display gain is associated with the annotation mode, wherein the first control display gain is different from the second control display gain. The second control display gain providing enable a more precise movement of the cursor for example.

In some embodiments, the pointing device includes one or more filters for filter the information from one or more of the gyroscope, accelerometer and magnetometer.

FIG. 1 illustrates a block diagram of a pointing device 10 that may perform any or all of operations of the methods and features explicitly or implicitly described herein, according to embodiments of the present disclosure. As shown, the pointing device 10 is configured as a pen, however other physical configurations of the pointing device are also envisioned for example a mouse, glove or other configuration of a pointing device as would be readily understood by a worker skilled in the art. The internal modules may be viewed as falling into different categories such as a user-interface module, positional module, and communication module. The user-interface module includes a multimode switch module 12. The positional module includes an inertial measurement unit (IMU) 16 or other positional module that is capable of determining at least a change is pitch and yaw of the pointing device. In some embodiments, the IMU is a 6-axis IMU which can include a gyroscope and an accelerometer, which can provide a means for determination of a change in pitch and yaw of the point device. In some embodiments, the IMU is a 9-axis IMU which can include a gyroscope, an accelerometer and a magnetometer which can provide a means for determination of a pitch and yaw of the pointing device.

According to embodiments, the multimode switch module 12 may be placed on a convenient location of the pointing device and may be a mechanical button, capacitive or resistive touch surface or button, force sensors placed at the sides of a housing associated with the pointing device, and may be implemented as a single button.

According to embodiments, the communication module 14 provides for the communication and transmission of information between the pointing device and the display device, wherein a cursor on associated with the display device can be controlled by movement of the pointing device. The information can be representative of the movement of the pointing device. The communication module 14 can be configured for transmission using one or more of a plural of communication protocols including WiFi, UWB, Bluetooth, near field communication (NFC) or other communication protocol as would be readily understood.

The communication module 14 may include hardware, firmware, and software support for communications protocols such as WiFi, UWB, and Bluetooth, near field communication or other communication protocol. WiFi refers to a family of wireless networking protocols based on the IEEE 802.11 family of standards. WiFi modules may use multiple-input multiple-output (MIMO) technology that allows for multiple transmit and receive antennas. The multiple paths between a MIMO transmitter and a MIMO receiver can allow for the estimation of the relative location and distance of a device, for example by calculating the angle of arrival (AoA) or time of flight (ToF) of received signals. UWB is a radio technology for low energy, short range, and high bandwidth communications that may also be used for substantially precise locating of devices using this technology. UWB location detection may use techniques such as measuring received signal strength (RSS), AoA, time of arrival (ToA), time difference of arrival (TDoA), etc. to determine the relative direction and distance between two devices. UWB location techniques may be used to determine the location of devices to within 10 cm. Bluetooth, including Bluetooth Low Energy (BLE) may be used to determine the distance between two devices. One method to use Bluetooth to determine a distance is by measuring the RSS and this technique can be accurate over a range of about 1 to 5 m. Near-field communication (NFC) describes a technology which can be used for contactless exchange of data over short distances. Two NFC-capable devices are connected via a point-to-point contact over a distance of 0 to 2 cm. This connection can be used to exchange data (such as process data and maintenance and service information) between the devices. NFC-enabled pointing devices can be provided with application software, for example to read electronic tags or other actions when connected to an NFC-compliant system.

According to some embodiments, the pointing device 10 may include a processor 18, for example a microcontroller, such as a central processing unit (CPU), a memory 20, which may include a non-transitory mass storage to store computer instructions and configuration parameters. Optionally, the processor or the microcontroller and the memory 20 could be implemented outside of the pointing device 10 and on other devices, for example, a computer or a display device works with the pointing device 10.

The memory 20 may include any type of non-transitory memory such as static random access memory (SRAM), dynamic random access memory (DRAM), synchronous DRAM (SDRAM), read-only memory (ROM), any combination of such, or the like. The memory may also include a mass storage element such as any type of non-transitory storage device, such as a solid state drive, hard disk drive, a magnetic disk drive, an optical disk drive, USB drive, or any computer program product configured to store data and machine executable program code. According to certain embodiments, the memory may have recorded thereon statements and instructions executable by the processor for performing one or more of the aforementioned method operations described herein.

According to certain embodiments, one or more of the depicted elements may be utilized, or only a subset of the elements may be utilized. Furthermore, the pointing device 10 may contain multiple instances of certain elements, such as multiple processors, memories, or modules. Also, elements of the hardware devices may be directly coupled to other elements without the bus. Additionally, alternatively to a processor and memory, other electronics, such as integrated circuits, may be employed for performing the required logical operations.

According to embodiments the pointing device 10 is capable of at least controlling a cursor associated with a display device. The display device includes the necessary computer hardware to communicate using one or more wireless networks as is necessary for the display device to be controlled by the pointing device 10. A non-exhaustive list of display devices may include a computer, a tablet, a television, and a smartphone. The computer may be a laptop or desktop computer including a processor, memory, and wireless communication interfaces such as, WiFi, Bluetooth, etc. The tablet is similar to a computer but typically has a GUI based on a touch screen interface. The television includes a screen and wireless communications hardware to communicate with the pointing device. The smartphone is similar to and a smaller version of the tablet with the addition of cellular communications hardware, software, firmware and is typically controlled using a touch screen GUI.

Figure 2:
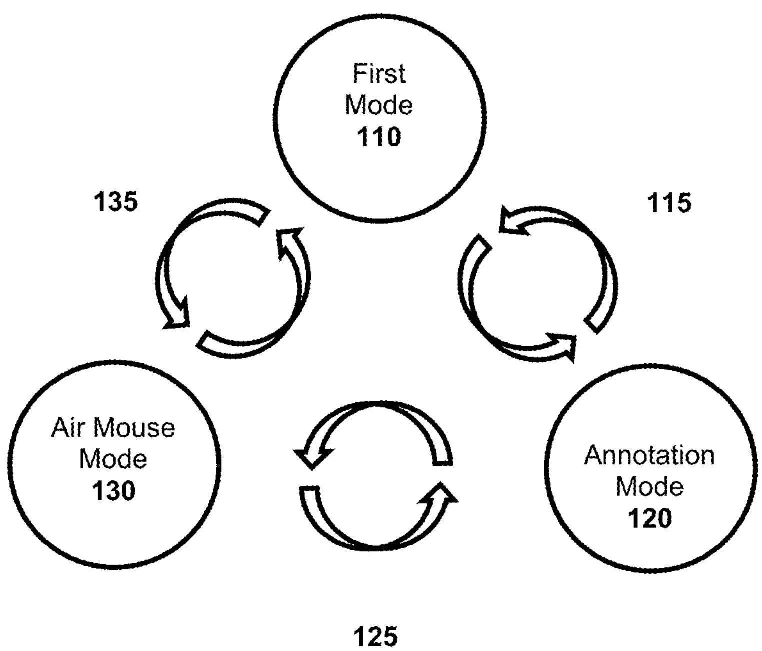
FIG. 2 illustrates mode transitions associated with the pointing device in accordance with embodiments of the present disclosure.

FIG. 2 illustrates mode transitions associated with the pointing device 10 in accordance with embodiments of the present disclosure. According to embodiments, the multimode switching module 12, for example a capacitive touch button, can be used for multiple mode switching in pointing device 10, for example a remote controlling pen. The multimode switching module 12 can allow for three operational states, for example non-touch or null, touched, and solid pressed. These operational states can be mapped to three modes of remote interaction with the display device, for example first mode (e.g. idle or near field writing mode), air mouse mode and annotation mode. This configuration can simplify the user experience while using the pointing device 10 for remote interaction. For example, as illustrated, non-touch of the capacitive touch button places the pointing device in the first mode 110. Touching 135 of the multimode switching module 12, for example the capacitive touch button, transitions the pointing device 10 to the air mouse mode 130 and removal of contact with the multimode switching module 12, for example the capacitive touch button, transitions the pointing device back to the first mode 110. Pressing 125 of the capacitive touch button transitions the pointing device 10 from air mouse mode 130 to annotation 120 mode and releasing the pressing but keeping the touching on the capacitive touch button transitions the pointing device 10 back to the air mouse mode 130. As illustrated, by moving straight from non-touch of the capacitive touch button to pressing of the capacitive touch button transitions the pointing device 10 from the first mode 110 to annotation mode 120, while completely removing the pressing and touching from or releasing the capacitive touch button completely transitions the pointing device 10 back to the first mode 110.

According to some embodiments, the multimode switching module includes a combination of at least two buttons.

For example, non-touch or non-contact of either of the two buttons can cause the pointing device to operate in the first mode. By pressing a first button, the pointing device can transition from the first mode into air mouse mode and release the pressing of the first button transitions the pointing device back into the first mode. When in air mouse mode, the pressing of the second button (for example, in addition to the pressing of the first button) transitions the pointing device into annotation mode. By releasing the pressing the second button and maintain the pressing of the first button the pointing device can return to air mouse mode. When in the first mode, by pressing both the first button and the second button the pointing device can transition directly into annotation mode, and release or pressing of both buttons transitions the pointing device back to the first mode. It will be readily understood that different combinations of pressing or releasing the two or more buttons can be associated with different modes of the pointing device.

According to embodiments an inertial measurement unit (IMU) is used for estimation of orientation of the pointing device 10, for example a remote controlling pen. The Euler angles, yaw, pitch, and roll are used to represent orientation estimation. Specifically, yaw (horizontal orientation) and pitch (vertical orientation) are used for during the annotation mode. According to some embodiments, for accurate yaw and pitch Euler angles estimation, a 9-axis IMU which includes a gyroscope, accelerometer and a magnetometer is used. According to some embodiments, a 6-axis IMU, which includes a gyroscope and accelerometer can be used if the increment or delta yaw and pitch over a short time use is desired.

According to embodiments, the use of a capacitive touch button for mode switching can help reduce the effect of drifting which can be associated with the pitch and yaw, and particularly associated with the yaw. For example, in the null state of the button (e.g. non-touch of the capacitive touch button), the cursor does not move even when the user rotates the pointing device 10, e.g. the controlling pen. The cursor moves when a user touches the capacitive touch button (e.g. transitioning to air mouse mode) and the cursor moves with a trace when a user presses the capacitive touch button (e.g. transitioning to annotation mode). To enter annotation mode, a user initially enters air mouse mode first to move the cursor to the starting point of annotation. Any drifting introduced in the first mode (e.g. idle mode) or air mouse mode will not be applied in the annotation mode. As the annotation mode uses increments of yaw and pitch and usually does not last for a long time, the drifting in the annotation mode may be ignored.

According to embodiments, a user can easily transition between the three modes with one finger, and without changing the posture of gripping the pointing device 10, e.g. a controlling pen, or moving the pointing device 10 by much. To start annotation, a user simply touches the capacitive touch button first and moves the cursor to the starting point of annotation, and subsequently presses down the capacitive touch button to start annotation. Besides making mode transition easier, the use of a capacitive touch button reduces the effect of IMU drifting in the annotation mode. Any long-time IMU drifting in the first mode (e.g. idle mode) and air mouse mode does not affect the short-time period typically associated with annotation mode. Existing drift may be addressed in the first mode, for example, regardless of how a user rotates the pointing device in the first mode, this movement would not change the cursor position. Only the increment of angles is used for air mouse mode and annotation mode. For example, the differences in the consecutive values of yaw and pitch angles (e.g. delta angles associated with pitch and yaw) are used to move the cursor in the x and y directions when in air mouse mode and annotation mode.

According to embodiments, an inertial measurement module (IMU) for orientation estimation and the sensor fusion process takes the IMU raw data and outputs (delta) yaw and pitch angles. In some embodiments, the IMU raw data includes gyroscope and accelerometer (e.g. 6-axis IMU) data. In some embodiments, the IMU raw data includes gyroscope, accelerometer and magnetometer (e.g. 9-axis IMU). The sensor fusion process takes the raw data and outputs the orientation estimation represented by Euler angles (yaw, pitch, and roll). For the determination of changes in the x and y axes of a cursor associated with a display device being controlled by the pointing device, e.g. pen, in air mouse mode and annotation mode, determination of the yaw and pitch angles need to be considered.

According to embodiments, sensor fusion is a process that takes IMU raw data as input and output Euler angles to represent the orientation of the pointing device 10. For gyroscope, accelerometer, and magnetometer raw data, a 1-euro filter is applied thereto which can provide a means for faster noise reduction. In some embodiments, a 6-axis IMU (e.g. having a gyroscope and accelerometer) data to compute an accurate pitch and roll angle, and then the magnetometer data is used to compute more accurate yaw data. It has been found that this process achieves small drifting performance even after long time use of the IMU.

Figure 3:
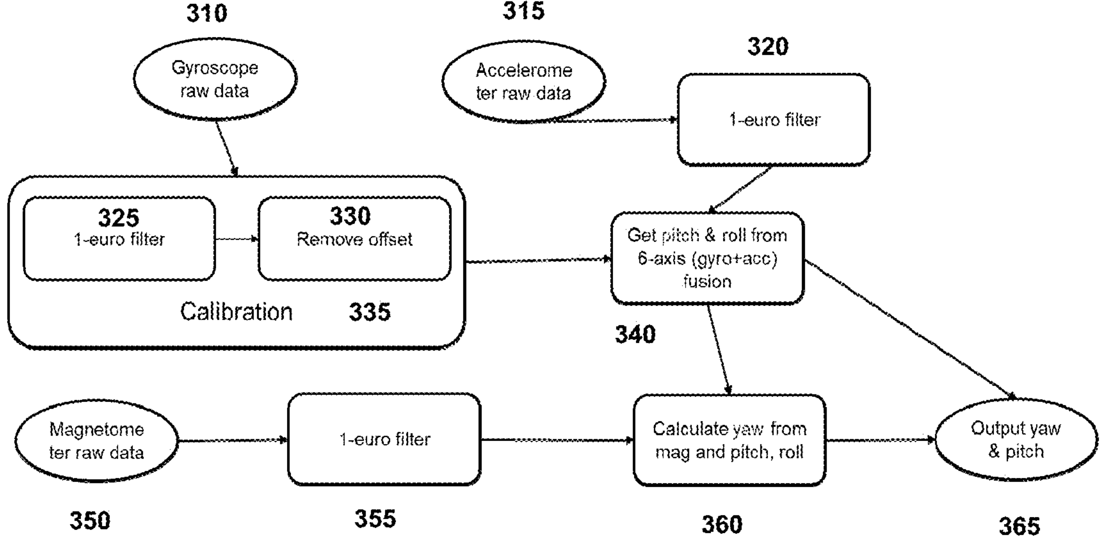
FIG. 3 illustrates a method with the inclusion of a filter for determination of pitch and yaw in accordance with embodiments of the present disclosure.

FIG. 3 illustrates a method with the inclusion of a low-pass filter for determination of pitch and yaw in accordance with embodiments of the present disclosure. The raw gyroscope data 310 is received for calibration 335. During the calibration a filter 325 (e.g. 1-euro filter) is applied to the raw gyroscope data in order to remove the noise in the signal. Subsequently, this filtered data is evaluated for removal of an offset 330 which is inherent in the gyroscope data. The raw accelerometer data 315 also filtered by a low-pass filter 325 (e.g. 1-euro filter). Sensor fusion 340 is applied to the calibrated gyroscope data and the filtered accelerometer data in order to determine the Euler angles related to pitch and roll. The raw magnetometer data 350 also filtered by a low-pass filter 355 (e.g. 1-euro filter) and this filter data together with the pitch and roll data from the sensor fusion 340, is used to calculate 360 the Euler angle related to yaw. Finally, the output of the method is the Euler angles related to pitch and yaw which can be used to determine changes in the x and y directional movement of a cursor associated with a display device that is being controlled by the pointing device 10.

It will be readily understood that the raw data from each of the gyroscope, accelerometer and the magnetometer include data on three axes (e.g. x-axis, y-axis and z-axis) for each sensor. As such for the data associated with each axis a filter is applied thereto in order to remove noise therein. As such, for the method defined above there would be in fact 9 filters configured for filtering the respective raw data. It should be further understood that there may be three different offsets applied to the gyroscope data, namely an offset associated with the data associated with each of the axes, (e.g. x-axis, y-axis and z-axis).

In more detail, and in accordance with embodiments of the present disclosure, a 9-axis sensor fusion process takes gyroscope, accelerometer, magnetometer raw data as input and outputs yaw and pitch Euler angles. A 1-euro filter is applied to each of the outputs to reduces noises in the raw data, using the raw gyroscope and accelerometer values as noisy samples. After the filtering process, the output will be a filtered sample value with lower noise. For a 6-axis IMU, 6 different 1-euro filters are used to filter the gyroscope and accelerometer raw data, namely one euro filter for each axis. For a 9-axis IMU, 3 further 1-euro filters are used to filter the magnetometer raw data.

It would be readily understood that other filtering techniques can be used in order to reduce the noise in the IMU raw data, namely the raw data received from the gyroscope and accelerometer and in some embodiments to further filter the magnetometer raw data. Other filters can include a high pass filter, low pass filter or other filter configuration as would be readily understood.

According to embodiments, when the IMU is static, namely not moving, the ideal gyroscope data should have an average of zero and a small standard deviation. However, in practice, there is an offset and high frequency noise in the gyroscope raw data. The low-pass filter can reduce noise efficiently, lowing the standard deviation. During the calibration of the IMU and filtering process, the IMU can be held static for a short period of time, for example a few seconds, averaging the readings of the gyroscope raw data (e.g resulting in a determination of the offset associated with the gyroscope, and subtracting this average from the raw data from the gyroscope. As such, the typical offset or inherent offset associated with the IMU can be mitigated from the collected data.

For example, the pointing device, for example a remote controlling pen, can be held stationary for 10 seconds. If the IMU data frequency is 100 Hz, there are 1000 data points for gyro_x (one axis of the gyroscope data). The raw data can have a high frequency noise therein. After applying the 1-euro filter to the gyro_x data, another 1000 data points that have a much smaller noise, i.e., standard deviation are determined. However, because of the offset of IMU devices, the average of these 1000 data points (mean_gyro_x) will not be 0. This mean gyro_x can be considered as the default offset of the IMU device and can be subtracted from the mean of future gyro_x data. After this type of calibration, the IMU gyro_x data will have a small noise (due to 1-euro filter) and an average value close to 0 (due to subtracting the offset). It will be readily understood that the values defined in this example (e.g. stationary time of the IMU and IMU sampling frequency) can be changed in practice. By doing the same calibration process for gyro_y and gyro_z, the gyroscope data can be suitable for the subsequent fusion process.

According to embodiments, after calibration, a 6-axis sensor fusion (e.g. sensor fusion applied to the gyroscope data and the accelerometer data) can be used in order to determine pitch and roll angles. Since the yaw angle represents the horizontal movement, which is orthogonal to the direction of gravity, the accelerometer is unable to measure when the pointing device (for example as measured by the IMU) is moving only horizontally (e.g. a movement where only yaw angles change). Accordingly, only pitch and roll angles are determined from the 6-axis sensor fusion.

There are existing algorithms for 6-axis sensor fusion. The basic idea of 6-axis sensor fusion is to use the different characteristics of gyroscope and accelerometer sensors to estimate Euler angles (yaw, pitch, and roll) to represent device orientation. The gyroscope data is accurate in short term, yet after integration over a longer period of time, errors will accumulate and the Euler angle will be inaccurate. The accelerometer data is accurate in long term, as errors introduced thereby will not accumulate over time. However, the short term noise associated with an accelerometer data is high, thus making an accelerometer inaccurate for short term use. According to embodiment, a complimentary filter is used to combine the characteristics of gyroscope and accelerometer sensors, enabling a more accurate prediction of pointing device orientation.

Algorithms such as that provided by Mahony, in Mabony, R., Hamel. T. and Pflimlin. J. M., 2008. Nonlinear complementary filters on the special orthogonal group. IEEE Transactions on automatic control. 53(5), pp. 1203-1218, define complimentary filters that can be used for 6-axis sensor fusion, as well as 9-axis sensor fusion. The idea is to integrate gyroscope data to get Euler angles, while attempting to avoid long-term noise, using accelerometer data to compensate gyroscope data before the integration. As mentioned before, 6-axis sensor fusion can only give accurate pitch and roll Euler angles.

Taking the Mahony algorithm as an example. Quaternions, for example defined as (q0, q1, q2, q3) in the formula below, are used to represent the rotation between world coordinate (R) and body coordinate (b). The world coordinate is known and does not change (e.g. east, north, up). Therefore, the goal of sensor fusion is transitioned to solving this quaternion, with an example thereof shown below.

$$C_R^b = \begin{pmatrix} 1-2(q_2^2+q_3^2) & 2(q_1q_2+q_0q_3) & 2(q_1q_2+q_0q_2) \\ 2(q_1q_2-q_0q_3) & 1-2(q_1^2+q_3^2) & 2(q_2q_3+q_0q_1) \\ 2(q_1q_3+q_0q_3) & 2(q_2q_3-q_0q_2) & 1-2(q_1^2+q_2^2) \end{pmatrix}$$

The first step is to normalize the accelerometer data from the IMU as defined below wherein ax, ay and az are accelerometer data based on the x-axis, y-axis and z-axis, respectively. In the equation, invSqrt is the fast inverse square root which may be used in order to normalize a vector.

recipNorm=invSqrt (ax*ax+ay*ay+az*ax)

ax*=recipNorm ay*=recipNorm az*=recipNorm

Next, the quaternion is used to transform real world gravity into the body coordinate of the IMU. Note that the gravity in world coordinate is (0, 0, 1).

$$halfvx = q1*q3 - q0*q2$$

$$halfvy = q0*q1 + q2*q3$$

$$halfvz = q0*q0 - 0.5 + q3*q3$$

Next, the cross product of the real gravity (in body coordinate) and the IMU accelerometer data (also in body coordinate) is determined. This will be used to compensate the gyroscope data.

halfex=(ay*halfvz−az*halfvy)

halfey=(az*halfvx−ax*halfvz)

halfez=(ax*halfvy−ay*halfvx)

Next, the gyroscope data is compensated with the cross product result, integrating the gyroscope data, and updating the quaternion. Finally, the quaternion is used to compute Euler angles as defined below.

$$gx *= (0.5 * \text{delta } t)$$

-continued $$gy *= (0.5 * \text{delta } t)$$

$$gz *= (0.5 * \text{delta } t)$$

$$qa = q0$$

$$qb = q1$$

$$qc = q2$$

$$q0 += (-qb * gx - qc * gy - q3 * gz)$$

$$q1 += (qa * gx + qc * gz - q3 * gy)$$

$$q2 += (qa * gy - qb * gz + q3 * gx)$$

$$q3 += (qa * gz + qb * gy - qc * gx)$$

wherein delta t is the time between two IMU readings (for example 0.01 s if the sampling rate is 100 Hz)

In this manner accurate pitch and roll angles can be determined by the 6-axis sensor fusion process. When the IMU further includes a magnetometer, the data therefrom is used to calculate an accurate yaw angle, as the magnetometer is capable of measuring when yaw angles change.

The following step is to get accurate yaw angle from pitch, roll, and magnetometer data.

$$\overline{m_x} = m_x \cos\Theta + m_y \sin\Phi \sin\Theta + m_z \cos\Phi \sin\Theta$$

$$\overline{m_y} = m_y \cos\Phi - m_z \sin\Phi$$

$$\psi_m = \text{arctan2}(\overline{m_y}, \overline{m_x})$$

where $m_x$ is magnetometer in x direction $m_y$ is magnetometer in y direction $m_z$ is magnetometer in z direction $\Phi$ is roll $\psi$ is yaw $\Theta$ is pitch According to embodiments, other examples for sensor fusion can include Mahony/Madgwich AHRS (attitude and heading reference system) algorithms.

According to embodiments, the different modes of the capacitive touch button can serve as the multimode switching module and trigger to enter different interaction modes: a first mode, an air mouse mode, and an annotation mode. In different modes, different control display (C/D) gains can be applied to control cursor movement associated with the display device. A goal for cursor movement when in air mouse mode and when in annotation mode can be different. For example, in air mouse mode, a user may like to move the cursor to the destination as quickly as possible. The destination of the cursor in air mouse mode is usually the starting point of annotation in annotation mode. For annotation, the goal is to be more accurate with cursor movement. Therefore, typically a bigger C/D gain is used for air mouse mode for faster cursor movement, and a smaller C/D gain is used for annotation mode for more accurate and precise cursor movement.

Figure 4:
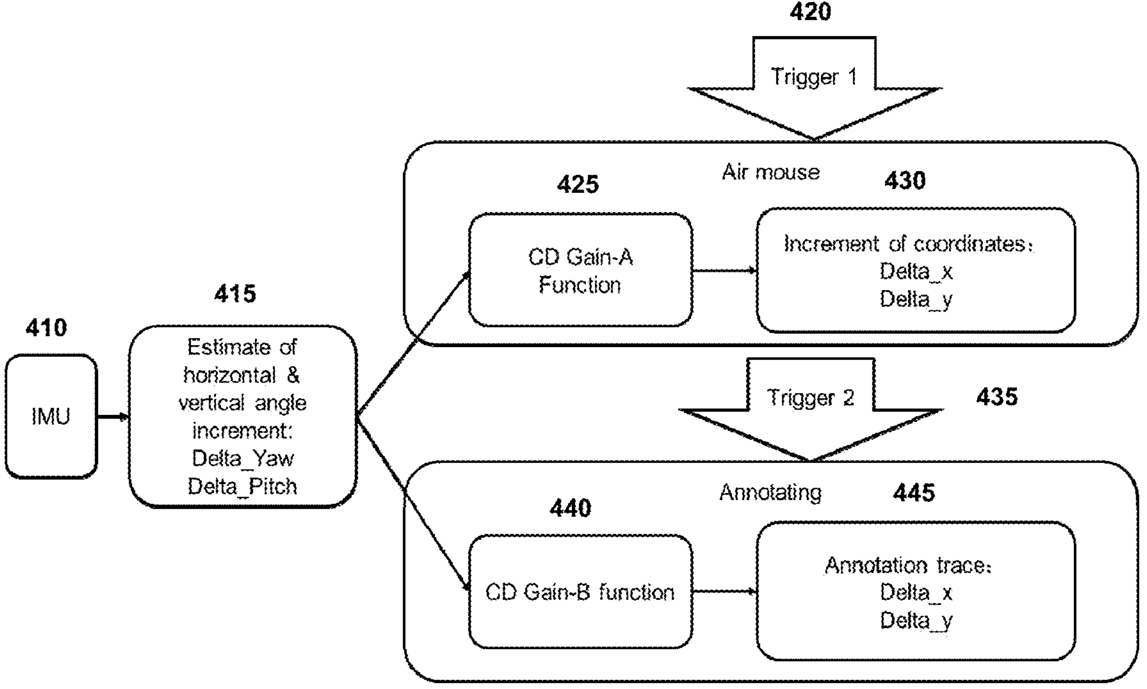
FIG. 4 illustrates a method for application of different control display gains in accordance with embodiments of the present disclosure.

FIG. 4 illustrates a method for application of different control display gains in accordance with embodiments of the present disclosure. The IMU 410 provides 415 estimates of the horizontal and vertical angle increments which can be determined from the change in pitch and the change in yaw. Upon activation of the multimode switch by a first trigger 1 420, for example contact of the capacitive touch switch, the pointing device enters air mouse mode and a first control display (C/D) gain is applied 425 to the horizontal and vertical angle increments which can result in the determination 430 of the increment in the coordinates associated with the x and y directions associated with the cursor associated with the display device being controlled by the pointing device. This can be the change in the x-axis coordinate and the y-axis coordinate.

However, if activation of the multimode switch by a second trigger 2 435 occurred, for example contact and pressing of the capacitive touch switch, the pointing device enters annotation mode and a second control display (C/D) gain is applied 440 to the horizontal and vertical angle increments which can result in the determination 445 of the increment in the coordinates associated with the x and y directions associated with the cursor associated with the display device being controlled by the pointing device. This can be the change in the x-axis coordinate and the y-axis coordinate.

According to embodiments, the use of a capacitive touch button can make it easier for mode switching and may reduce the effect of IMU drifting during use in annotation mode. In some embodiments, in the first mode, i.e., when users are not touching the button, any movement of the pointing device, for example the remote controlling pen, would not move the cursor. Therefore, any drifting in this period would not affect the cursor movement. According to embodiments, the sensor fusion process associated with data received by using a 9-axis IMU can reduce drifting of the data from the IMU even after extended use. In some embodiments, the application of different C/D gains for different interaction tasks, e.g. cursor movement tasks, may improve user experience during annotation.

According to embodiments, the C/D gain can determine cursor position and thus movement using the change (e.g. delta) of the Euler angles (e.g pitch, yaw and roll). The delta yaw controls x coordinate and delta pitch controls y coordinate. According to embodiments, the use the tangent of the delta angles, can provide some physical meaning to the C/D gain. In the following formula, curr_x and curry are the current x and y coordinates. The delta_yaw and delta_pitch are the increment of the yaw and pitch between two consecutive readings of the yaw and pitch angles.

$$\text{curr\_x} = \text{curr\_x} + (\text{delta\_yaw}) * \text{const\_t}$$

$$\text{curr\_y} = \text{curr\_y} + (\text{delta\_pitch}) * \text{const\_t}$$

Alternatively, using tangent of the delta angles can be performed as defined below.

$$\text{curr\_x} = \text{curr\_x} + \tan(\text{delta\_yaw}) * \text{const\_t}$$

$$\text{curr\_y} = \text{curr\_y} + \tan(\text{delta\_pitch}) * \text{const\_t}$$

The const_t can be a constant that varies between air mouse mode and annotation mode. Typically air mouse mode requires a larger constant, sine a user typically requires the movement of the cursor to the desired position as quickly as possible. The trajectory of cursor associated with air mouse mode can be considered unimportant, which is contrary to tasks performed in annotation mode. Moreover, for different annotating tasks, e.g., drawing a big shape vs. drawing a small shape, dynamic constants (factors) may be used. Users may prefer a faster moving cursor when drawing a big shape, and therefore a larger const_t may be required. Precision is typically more preferred when drawing a small shape, therefore a smaller const_t may be required. There is a speed/precision trade-off when determination of the gain factor is made. Typically a smaller const_t would correspond to lower speed and higher precision, and a larger const_t would correspond to higher speed and lower precision.

For example, for freehand annotation, every trace of the cursor movement is kept on the screen. One of the ways of determining dynamic factors (e.g. the evaluation of the const_t) is to base this determination on the speed users move the pointing device, for example a remote controlling pen. When the angular velocity (which may be determined from the gyroscope data) is big, a larger factor may be used. When the angular velocity is small, a small factor may be used. The thresholds of angular velocities may be determined through user studies. If multiple thresholds of angular velocity are used for determination of a factor, and the angular velocity is between these thresholds, the gain factor may change continuously, which in some instances may be an undesired effect.

Figure 5:
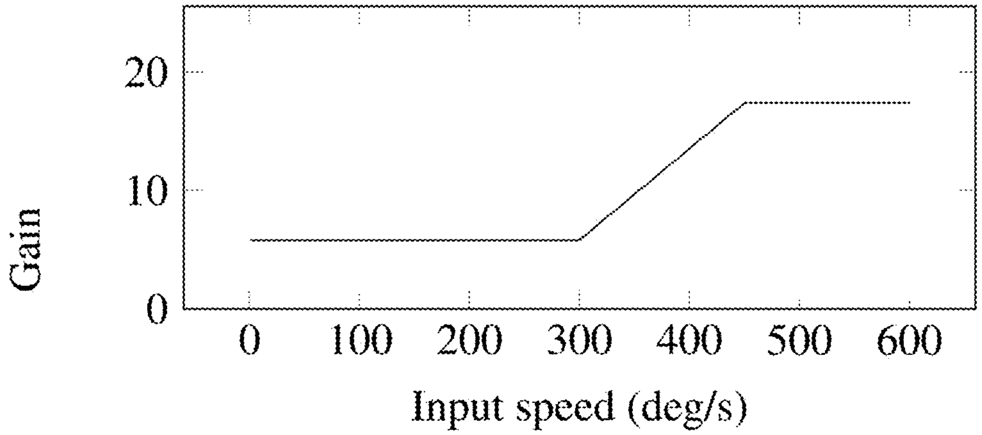
FIG. 5 illustrates a linear transition between control display gains in accordance with embodiments of the present disclosure.

FIG. 5 illustrates a linear transition between control display gains in accordance with embodiments of the present disclosure. The lower bound of the threshold corresponds to a smaller C/D gain. When a user moves the pointing device, e.g. a remote controlling pen, slower than the lower bound velocity when annotating, it can be assumed that the user prefers to have more precision during annotation (e.g. circling a small amount of text, drawing a specific type of shape, or the like), and therefore a smaller gain can be applied. The upper bound of the threshold corresponds to a bigger C/D gain. When a user moves the pen faster than the upper bound velocity when annotating, it can be assumed that the user prefers to have more cursor speed during annotation (e.g. drawing a line across the whole screen), and therefore a larger gain can be applied. When the angular velocity is between these two thresholds, the gain factor can be viewed as changing continuously. It would be understood that if a single threshold was used for C/D gain transition, the can be an abrupt change in cursor movement when a user is moving the pointing device around the threshold speed. This may result in an undesired user experience.

According to embodiments, a change the C/D gain during a stroke is undesired. A change in C/D gain during a stroke may confuse a user, for example when a user starts a stroke of the pointing device in annotation mode, it is undesired to change the C/D gain until the stroke is finished. For example, if the C/D gain is changed during a stroke, when a user starts in annotation mode at position A and releases the multimode switch module, for example the capacitive touch button, at the same position, the cursor will not be at the same location, since the gain is always changing based on the velocity of the pointing device.

According to embodiments, the velocity of the pointing device in the first t milliseconds of the stroke can be used to determine which C/D gain to be applied to in the entire stroke. For example, when in annotation mode, if the average velocity of the first 30 milliseconds of a stroke falls under the lower bound of the threshold, it can be assumed that the user prefers more precision in this annotation task, and as such it will be determined that a small C/D gain be used for the entire stroke. On the other hand, if the average velocity of pointing device over the first 30 milliseconds of the stroke is faster than the upper bound of the threshold, it can be assumed that the user prefers more speed in this annotation task, and as such it will be determined that a larger C/D gain be used for the entire stroke.

Figure 6:
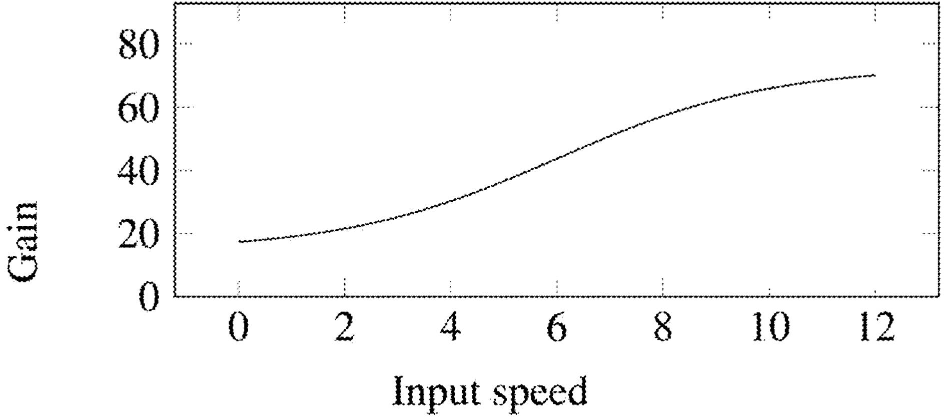
FIG. 6 illustrates a curvilinear transition between control display gain in accordance with embodiments of the present disclosure.

Other forms of C/D gains can be used for air mouse mode and annotation mode. For example, the same linear C/D gain can be used for both air mouse mode and annotation mode. In addition, for example if different thresholds are used to determine different steps or changes in C/D gain, the C/D gain between these thresholds can change non-linearly resulting in a more gradual change in the C/D gain between the threshold rather than a more abrupt change. One example of a gradual change function can be a Sigmoid curve, such as a logistic function and illustrated in FIG. 6. FIG. 6 illustrates a curvilinear transition between control display gain in accordance with embodiments of the present disclosure.

$$S(t) = \frac{1}{1 + e^{-t}}$$

According to some embodiments, instead of using angular velocity of the pointing device, the C/D gain to be applied can be defined based on the specific shape that is being drawn in annotation. For example, drawing a straight line would require a different C/D gain than drawing a circle.

In some embodiments, the pointing device can be configured to evaluate the shape of the target shape is selected or known. If it is known that a user wants to draw a straight line, the trace will be determined by connecting the starting point and the current cursor position. If the direction of the line is also predetermined, the trace can be constrained to that specific direction. Any movement that is perpendicular to the line direction will not have any effect on the annotation during annotation mode. In cases where the predetermined annotation shape is a closed shape (e.g. a circle), a similar approach can be used to constrain cursor movement by a certain shape. By constraining cursor movement to a predetermined shape, a substantially perfect line/circle/rectangle can be drawn.

In some cases, it may not be known what shape a user wants to draw. As such anticipation of the shape to be drawn can be required when a user starts to annotate in annotation mode. To anticipate what shape a user wants to draw, collection of data about a user drawing different shapes can be required. For example, in the user studies, a participant can be asked to try to do tasks with different shapes and sizes, making them draw with the pointing device (e.g. remote pen) in mid-air, while not providing any visual feedback to the participant. The pointing device movement information (e.g. angular velocities, Euler angles) during the entire process for each shape and size can be collected, before analyzing the data for different patterns. In this example, a deep learning model may be developed that can be configured to learns these patterns. Therefore, the next time a user starts drawing a shape, in the first few seconds (or even less) of annotation in annotation mode, anticipation of the shape that the user wants to draw can be made, thereby providing a means for determining an appropriate C/D gain to be applied during annotation mode.

For example, the initial t milliseconds of an annotation stroke in annotation mode can be used to predict the shape that a user wants to draw. If the stroke from the first few milliseconds does not have much curvature and the horizontal angular velocity is typically bigger than the vertical angular velocity, it can be assumed that the user wants to draw a horizontal straight line. In this case, a different const_t for horizontal and vertical cursor movement can be applied, helping the user to draw a more prefect straight line. Specifically, the const_t can be made bigger for horizontal control (e.g. delta_yaw) and a smaller const_t can be applied for vertical (e.g. delta_pitch) angle increment. Therefore, the stroke will be kept close to a horizontal straight line, as defined below.

const_t_yaw = const_t const_t_pitch = 0

Similarly, when the vertical angular velocity is typically bigger than the horizontal angular velocity, the stroke can be kept close to a horizontal straight line, as defined below.

const_t_yaw = 0 const_t_pitch = const_t

On the other hand, if the stroke from the first t milliseconds indicates a lot curvature, it can be assumed that the user wants to draw a circular shape. In this case, the const_t can be held constant.

const_t_yaw = const_t_pitch = const_t

It will be understood that the anticipation or selection of a shape for drawing during annotation mode may require computational power that is not present within the pointing device. In this case, the pointing device can provide the information relating to changes in the Euler angles of pitch and yaw, or simply the IMU raw data to the display device associated with the cursor and the display device can perform the necessary computations prior to movement of the cursor on a screen associated therewith.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a pointing device according to the method of the technology and/or to structure some or all of its components in accordance with the system of the technology.

Through the descriptions of the preceding embodiments may be implemented by using a combination of hardware and software. Based on such understandings, portions of the present disclosure may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a pointing device to execute the methods provided in the embodiments.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A pointing device comprising:

a multimode switching module, switching a mode of the pointing device between a first mode, an air mouse mode, and an annotation mode;

a processor configured for detecting the mode of the pointing device;

an inertial measurement unit (IMU), obtaining information indicative of orientation of the pointing device upon the processor detecting that the mode of the pointing device switches from the first mode to the air mouse mode or the annotation mode; and a communication module, obtaining the information from the IMU and transmitting the information to a display device;

wherein a first control display gain is associated with the air mouse mode and a second control display gain is associated with the annotation mode; the first display gain is different from the second display gain.

2. The pointing device of claim 1, further including at least one of:

a first low-pass filter, which is configured to modify output from a gyroscope associated with the IMU; and a second low-pass filter, which is configured to modify output from an accelerometer associated with the IMU.

3. The pointing device of claims 1, further includes a first low-pass filter, a second low-pass filter, and a third low-pass filter, wherein the first low-pass filter is configured to modify output from a gyroscope associated with the IMU, the second low-pass filter is configured to modify output from an accelerometer associated with the IMU, and the third low-pass filter is configured to modify output from a magnetometer associated with the IMU.

4. The pointing device of claim 1, wherein the first mode is one of:

an idle mode; and a near field writing mode, wherein the communication module is further configured to transmit information indicative of the near field writing mode.

5. The pointing device of claim 1, wherein when the pointing device is in one of:

the air mouse mode, wherein a cursor moves on the display device according to the information indicative of orientation of the pointing device; and the annotation mode, wherein a trajectory shows on the display device according to the information indicative of orientation of the pointing device.

6. The pointing device of claim 1, wherein the multimode switching module is a capacitive touch button having at least three states, each state corresponding to one of the modes of the pointing device.

7. The pointing device of claim 6, wherein the at least three states of the capacitive touch button include a non-touch state corresponding to the first mode of the pointing device, a touched state corresponding to the air mouse mode, and a pressed state corresponding to the annotation mode.

8. The pointing device of claim 1, wherein the multimode switching module includes a combination of at least two buttons, wherein a combination of states of each of the at least two buttons corresponds to one of the modes of the pointing device, wherein a different combination defines each mode of the pointing device.

9. The pointing device of claim 1, wherein the IMU is a 6-axis IMU including a gyroscope and an accelerometer, wherein the gyroscope and accelerometer are configured to provide the information indicative of a change in vertical and horizontal orientation of the pointing device.

10. The pointing device of claim 1, wherein the IMU is a 9-axis IMU including a gyroscope, an accelerometer and a magnetometer, wherein the gyroscope and the accelerometer are configured to provide the information at least indicative of a change in the horizontal and vertical orientation of the pointing device and wherein the magnetometer is configured to provide further data for refined determination of the change in the horizontal orientation of the pointing device.

11. A method for remotely interacting with a display device by a pointing device, the method comprising:

switching, by a multimode switching module, the pointing device between a first mode, an air mouse mode, and an annotation mode;

detecting, by a processor, a mode of the pointing device;

obtaining, from an inertial measurement unit (IMU), information indicative of an orientation of the pointing device upon the processor detecting that the pointing device switching from the first mode to the annotation mode or the air mouse mode;

obtaining, by a communication module, the information and transmitting the information to the display device;

wherein the first mode is a near field writing mode, wherein the method further includes transmitting by the communication module information indicative of the near field writing mode and in the air mouse mode, a cursor associated with the display device moves at least in part based on the information indicative of orientation of the pointing device.

12. The method of claim 11, further comprising applying a first control display gain when operating the pointing device in the air mouse mode and determining a cursor position using the information indicative of the orientation of the pointing device for evaluation of a horizontal orientation and a vertical orientation of the pointing device and a horizontal angular velocity and a vertical angular velocity of the pointing device.

13. The method of claim 11, wherein applying a second control display gain when operating the pointing device in the annotation mode and determining a trajectory of the cursor using the information indicative of the orientation of the pointing device for evaluation of a horizontal orientation and a vertical orientation of the pointing device and a horizontal angular velocity and a vertical angular velocity of the pointing device.

14. The method of claim 13, wherein applying the first control display gain further includes determining a velocity associated with the pointing device and selecting the first control display gain based on the velocity and applying the second control display gain further includes determining a velocity associated with the pointing device and selecting the second control display gain based on the velocity.

15. The method of claim 11, wherein upon detection of the pointing device being in the annotation mode, the method further includes predicting a shape being annotated.

16. The method of claim 11, further including filtering using at least one of a first low-pass filter output from a gyroscope associated with the IMU and filtering using a second low-pass filter output from an accelerometer associated with the IMU.

17. The method of claim 11, further including filtering using a first low-pass filter, a second low-pass filter, and a third low-pass filter, wherein the first low-pass filter modifying output from a gyroscope associated with the IMU, the second low-pass filter modifying output from an accelerometer associated with the IMU, and the third low-pass filter modifying output from a magnetometer associated with the IMU.

18. A non-transitory computer-readable storage medium comprising instructions which, when executed by a computer, cause the computer to:

switch, by a multimode switching module, the pointing device between a first mode, an air mouse mode, and an annotation mode, wherein the first mode is a near field writing mode;

detect, by a processor, a mode of the pointing device;

obtain, from an inertial measurement unit (IMU), information indicative of an orientation of the pointing device upon the processor detecting that the pointing device switching from the first mode to the annotation mode or the air mouse mode;

obtain, by a communication module, the information and transmitting the information to the display device; and transmit, by the communication module, information indicative of the near field writing mode and in the air mouse mode, a cursor associated with the display device moves at least in part based on the information indicative of orientation of the pointing device.

* * * * *